(12) United States Patent
de Castro

(10) Patent No.: US 11,007,795 B2
(45) Date of Patent: May 18, 2021

(54) HEAT TRANSFER TICKET

(71) Applicant: Avery Dennison Corporation, Mentor, OH (US)

(72) Inventor: Paulo J. de Castro, Sant Cugat del Valles (ES)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 14/584,039

(22) Filed: Dec. 29, 2014

(65) Prior Publication Data

US 2016/0159106 A1    Jun. 9, 2016

Related U.S. Application Data

(60) Provisional application No. 61/975,977, filed on Apr. 7, 2014.

(51) Int. Cl.
*B41J 3/407* (2006.01)
*G06Q 10/02* (2012.01)
(Continued)

(52) U.S. Cl.
CPC ............ *B41J 3/4078* (2013.01); *B41J 2/325* (2013.01); *B44C 1/1712* (2013.01); *G06Q 10/02* (2013.01); *G06Q 30/0241* (2013.01); *G07B 15/00* (2013.01)

(58) Field of Classification Search
CPC ...... B41J 3/4078; B41J 2/325; B41J 11/0015; B41J 11/002; B41J 2/005; B41J 2/0057;
(Continued)

(56) References Cited

U.S. PATENT DOCUMENTS 4,610,904 A * 9/1986 Mahn, Sr. ................ D06Q 1/00
428/79
5,364,688 A    11/1994 Mahn
(Continued)

FOREIGN PATENT DOCUMENTS

CN    1852810    10/2006
CN    101861591    10/2010
(Continued)

OTHER PUBLICATIONS

International Search Report and Written Opinion dated Apr. 29, 2015 for International Application No. PCT/US2014/072487 filed Dec. 29, 2014.
(Continued)

*Primary Examiner* — Bradley W Thies

(57) ABSTRACT

A unique heat transfer is disclosed for use on specific merchandising articles for a specific event. The heat transfer would be used to promote an event and would be used as a ticket to that event. The heat transfer comprises printed matter applied to a base material. The base material would be part of a clothing article, such as a t-shirt, cap, sweatshirt, garment, accessory etc. The printed matter would be visually recognizable information incorporating text, pictures, numbers, bar codes, and QR codes. The visually recognizable information can be printed with ultraviolet-curable inks, or other suitable inks. Once the heat transfer is applied to the clothing article, user would use the clothing article as a ticket to the event. The heat transfer on the clothing article would be scanned and the unique bar code and/or QR codes would be used to identify the user's seat location and other identifying details.

17 Claims, 3 Drawing Sheets

(51) Int. Cl.
    *B44C 1/17*     (2006.01)
    *G06Q 30/02*     (2012.01)
    *B41J 2/325*     (2006.01)
    *G07B 15/00*     (2011.01)

(58) Field of Classification Search
    CPC ........ B41J 2002/012; B41J 2/22; B41J 2/315; G06Q 20/00; G06Q 10/02; B44C 1/1712; G07B 15/00
    See application file for complete search history.

(56) References Cited

U.S. PATENT DOCUMENTS

| | | |
|---|---|---|
| 5,368,334 A | 11/1994 | Christy et al. |
| 5,979,941 A | 11/1999 | Mosher et al. |
| 6,142,368 A | 11/2000 | Mullins et al. |
| 6,152,374 A | 11/2000 | Moriyama et al. |
| 6,326,071 B1 | 12/2001 | Francoeur |
| 8,038,831 B2 | 10/2011 | Halope et al. |
| 2002/0195499 A1 | 12/2002 | Ferro |
| 2003/0213842 A1* | 11/2003 | Jackson ........... G06K 19/06009 235/380 |
| 2006/0228525 A1 | 10/2006 | Dakowski |
| 2008/0103802 A1 | 5/2008 | Leach et al. |
| 2009/0119818 A1 | 5/2009 | Ngo et al. |
| 2010/0230946 A1* | 9/2010 | Kanda ............... B42D 15/0093 283/85 |
| 2011/0307420 A1 | 12/2011 | Shaw et al. |
| 2012/0174288 A1 | 7/2012 | Kovalov |
| 2012/0320428 A1* | 12/2012 | Jetter .................. G06Q 50/22 358/3.28 |
| 2014/0109362 A1 | 4/2014 | Bassi |
| 2014/0360397 A1 | 12/2014 | White |

FOREIGN PATENT DOCUMENTS

| | | |
|---|---|---|
| EP | 0184925 | 6/1986 |
| JP | S61-254399 | 11/1986 |
| JP | H04-190495 | 7/1992 |
| JP | H09-300894 | 11/1997 |
| JP | H10-157399 | 6/1998 |
| JP | 3055361 | 1/1999 |
| JP | 11-34598 | 2/1999 |
| JP | H11-52863 | 2/1999 |
| JP | H11-227367 | 8/1999 |
| JP | 2001-504404 | 4/2001 |
| JP | 2001-138673 | 5/2001 |
| JP | 2005-275436 | 10/2005 |
| JP | 2006-507962 | 3/2006 |
| JP | 2006-201997 | 8/2006 |
| JP | 2007-276486 | 10/2007 |
| JP | 2008-110508 | 5/2008 |
| JP | 2008-120086 | 5/2008 |
| JP | 2008-207558 | 9/2008 |
| JP | 2010-182312 | 8/2010 |
| JP | 2010-214636 | 9/2010 |
| JP | 2011-076520 | 4/2011 |
| JP | 2011-126281 | 6/2011 |
| JP | 2011-256511 | 12/2011 |
| JP | 2013-091203 | 5/2013 |
| JP | 2013-092746 | 5/2013 |
| JP | 2013-193321 | 9/2013 |
| JP | 3190145 | 4/2014 |
| JP | 2014-81907 | 5/2014 |
| KR | 10-2013-0104809 | 9/2013 |
| KR | 10-2013-0123018 | 11/2013 |
| WO | 98/23081 | 5/1998 |
| WO | 2009149039 | 12/2009 |
| WO | 2010105190 | 9/2010 |
| WO | 2014041738 | 3/2014 |

OTHER PUBLICATIONS

International Preliminary Report on Patentability dated Oct. 12, 2016 for International Application No. PCT/US2014/072487 filed Dec. 29, 2014.

European Search Report dated Jun. 8, 2018 for Application No. EP18171800.

Ticket T-Shirt, http://www.tshirtsunited.com/catalogue/tag/match_ticket.html, TShirtsUnited, searched Mar. 17, 2014.

EDS Bib Number Look Up, https://www.eventdatasolutions.com/products/page13/page4/page4.html, Event Data Solutions, searched Mar. 17, 2014.

Shirt Printing, http://ultramaxsports.com/event-services/shirt-printing/, Ultramax Sports, searched Mar. 17, 2014.

Thermally Welded Vynil on T-Shirts, http://www.qprintosona.com/textil.php?language=en, Qprint Osona, S.L., searched Mar. 17, 2014.

2013 Season Last 3 Games, Information of "T-shirt ticket" Sales Start, [online], Japan, Tokyo Verdy, Inc., Sep. 26, 2013, [searched on Jan. 10, 2019], internet < URL:https://www.verdy.co.jp/news/1593>.

* cited by examiner

HEAT TRANSFER TICKET

CROSS-REFERENCE TO RELATED APPLICATION(S)

The present application claims priority from U.S. Provisional Application No. 61/975,977 filed Apr. 7, 2014 which is incorporated by herein by reference in its entirety.

BACKGROUND

The present invention relates generally to heat transfers for use on specific merchandising. In a variety of different events, such as concerts sports games, fairs, etc., it is important to have an admission ticket, and/or to provide other types of identifying information. However, conventional admission tickets tend to be small in size which allows the ticket to be lost and/or misplaced easily. Furthermore, paper is the typical medium used as a base material for a ticket, with the printed matter on the ticket formed by inkjet printing or by other conventional printing technologies. However, if the paper ticket is used under adverse conditions, such as wind or rain, the ticket can be destroyed. Conventional admission tickets may also be subject to counterfeiting due to their printing methods and ease of replication. Depending on the event, additional personal information is sometimes needed from the user and this information is required to be retrieved rapidly. However, due to increased concerns in the way in which personal information is handled, incorporating this type of personal information on a ticket or other public item is not appropriate.

Thus, there is a need for a device that incorporates an admission ticket or other similar entry device or key, and that allows the ticket not to be easily lost or destroyed in adverse conditions, prevents against counterfeiting, as well as can be loaded with a user's personal information without disclosing the information to the public.

The present invention discloses a unique heat transfer for use on specific merchandising articles for a specific event. The heat transfer would be used to promote an event and would be used as a ticket/entrance to that event. Typically, the heat transfer is applied to an article of clothing, such as a t-shirt. A user would use the t-shirt as a ticket to gain entrance to the event. The heat transfer on the shirt would be scanned and the unique bar code and/or QR (quick response) codes would be used to identify the user's seat location and other identifying details, such as personal information. Thus, the user would not need a paper ticket to be admitted into the event, and the user would not be worried about the ticket being destroyed due to wind or rain, or other adverse conditions. In addition, the user is provided with an authentic article or souvenir from the particular event which may provide additional incentive to the consumer to purchase the article to which the code is applied or otherwise affixed.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a unique heat transfer label for use on specific merchandising articles, such as apparel items for a specific event. The heat transfer would be used to promote an event and would be used as a ticket or key to gain entrance to that event. The heat transfer includes a printed matter applied to a base material. The base material is typically a non-woven fabric material, but can be any suitable material as is known in the art. The base material would be part of a clothing article, such as a t-shirt, cap, sweatshirt, etc. The printed matter would be visually recognizable information incorporating text, pictures, and numbers, as well as bar codes and QR Codes®. The visually recognizable information can be printed with ultraviolet-curable inks, or other suitable inks as is known in the art.

In a preferred embodiment, the heat transfer is an admission ticket or key to a specific event and is applied to the front of an apparel item such as a shirt, scarf, pants, shorts, belt, or any apparel accessory, via any suitable heat transfer means, e.g. heat and/or pressure. A user would use the apparel item or shirt as a ticket or key to gain entrance to the event. The heat transfer would be scanned from the front of the shirt, and the unique bar code and/or QR codes would be used to identify the user's or consumer's seat location as well as provide other identifying details. The user would not need a paper ticket to be admitted into the event, and would not have to worry about losing their admission ticket, as the user or consumer would be wearing the ticket as part of the apparel item.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
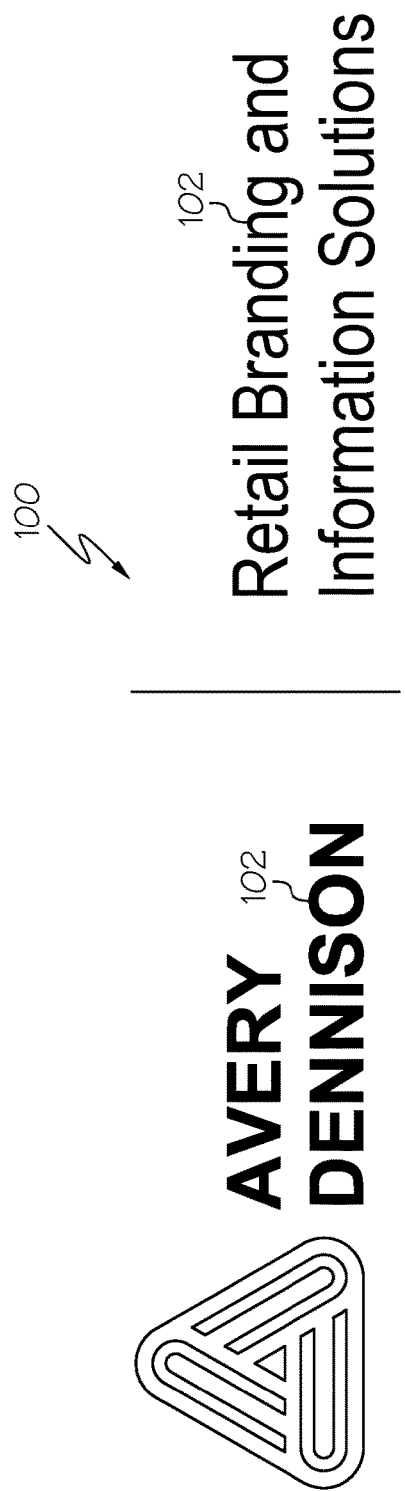
FIG. 1 illustrates a front view of the unique heat transfer in accordance with the disclosed architecture.
Figure 1:
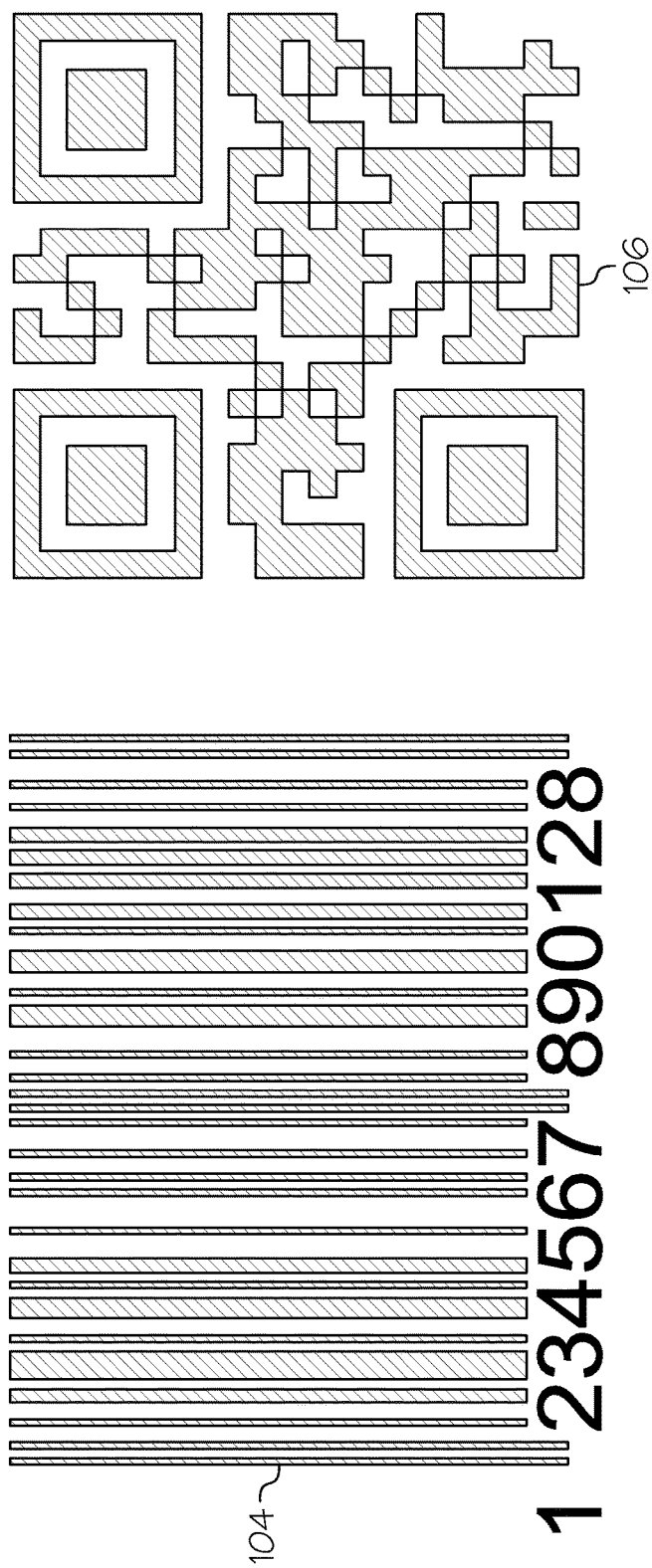

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a unique heat transfer device such as a heat transfer label for use on certain merchandising articles for a specific event, such as a sporting or entertainment event, university or scholastic activity, or similar situations where some control is placed over admission to a venue. The heat transfer would be used to promote an event and would be used as a ticket or key to gain entrance to that event. Typically, the heat transfer is applied to an apparel article such as clothing, and may include a shirt, pants, hat, scarf or other garment or apparel accessory. A user would use the shirt as a ticket to gain entrance to the event. The heat transfer on the shirt would be scanned and the unique bar code and/or QR codes would be used to identify the user's seat location and other identifying details, such as personal information. Thus, the user would not need a paper ticket to be admitted into the event, and the user would not be worried about the ticket being destroyed due to wind or rain, or other adverse conditions.

The unique heat transfer includes printed matter applied to a base material. The base material would be part of a clothing article, such as a t-shirt, cap, sweatshirt, other garment or apparel accessory, etc. The printed matter would be visually recognizable information incorporating text, pictures, numbers, bar codes, and QR codes. The visually recognizable information can be printed with ultraviolet-curable inks, flexographic inks, digital inks or toners or other suitable inks or toners. Once the heat transfer is applied to the clothing article or apparel item, a user would use the clothing article as an admission ticket to the event, such as by scanning or reading the code(s) that have been printed or imaged on the item.

Referring initially to the drawings, FIG. 1 illustrates a unique heat transfer 100 which would be applied to specific merchandising apparel to promote a specific event and/or to be used as a ticket or some sort of key or guide to gain entrance to that event. The unique heat transfer 100 may be formed by any suitable method for forming heat transfers as is known in the art. Exemplary heat transfers are available from Avery Dennison Retail Branding and Information Services of Westborough, Mass. and sold under brand names such as UNITI™, AGILITY® and AVERY DENNISON®. Heat transfers useable in connection with the present invention may include breathable flexible transfers which may lend themselves to particular athletic events.

The unique heat transfer 100 further comprises printed matter 102. The printed matter would be visually recognizable information incorporating text, pictures, and numbers, as well as bar codes and QR Codes®, which are associated with a specific event. Any suitable printed material can be incorporated into the printed matter 102 of the heat transfer 100, as is known in the art as long as it pertains to the specific event.

For example, a person's face or other image can be printed on the heat transfer 100. The inclusion of a person's face which is related to the event or a face of a public attendant would maximize the proposed singularity of the unique heat transfer 100. A sponsor's image or logo for the specific event can also be printed on the heat transfer 100, as well as other identifying information for the sponsor, such as unique colors or slogans that are associated with the sponsor, etc.

Typically, an entrance or admission ticket to the specific event is printed on the heat transfer 100 to specifically identify a user and/or a seat location for the specific event. Other details relating to the particular event can also be printed in the area of the admission information as will be described in connection with FIG. 3. The admission ticket can also include bar codes 104, QR codes 106, and other identifying information. The bar codes 104 correspond to individual identification information stored in a database and can be printed on the heat transfer 100 to specifically identify a user and/or a seat location for a specific event. The QR codes 106 relate to specific and/or personal information about the user which is stored in a database. The QR codes 106 can be printed on the heat transfer 100 to specifically identify a user and/or identify information about that user for a specific event.

Additionally, any specific event can used with the heat transfers, such as sports games, concerts, gourmet events, fairs, trade shows, entertainment or amusement parks, etc. Specifically, the heat transfer 100 can be used to identify any suitable event as is known in the art, as long as an admission ticket or key or other suitable identifying criteria is needed to gain admission to the event.

Furthermore, the printed matter 102 would be printed with any suitable ink as is known in the art. For example, the printed matter 102 can be printed with ultraviolet-curable inks to provide a printed matter 102 that includes optically readable information, has excellent durability against wind, rain, and light, and can be produced more simply and at low cost. Further, the ultraviolet-curable (UV) inks for example can be used for anti-counterfeit features, to guarantee that the admission tickets/shirts are authentic and have been legally acquired by the user. The ultraviolet-curable inks can be any type as long as the ink can be cured by being irradiated with ultraviolet radiation. Other suitable inks can be used for the printed matter 102 as is known in the art, as long as the inks provide visually recognizable information and durability against adverse conditions.

Figure 2:
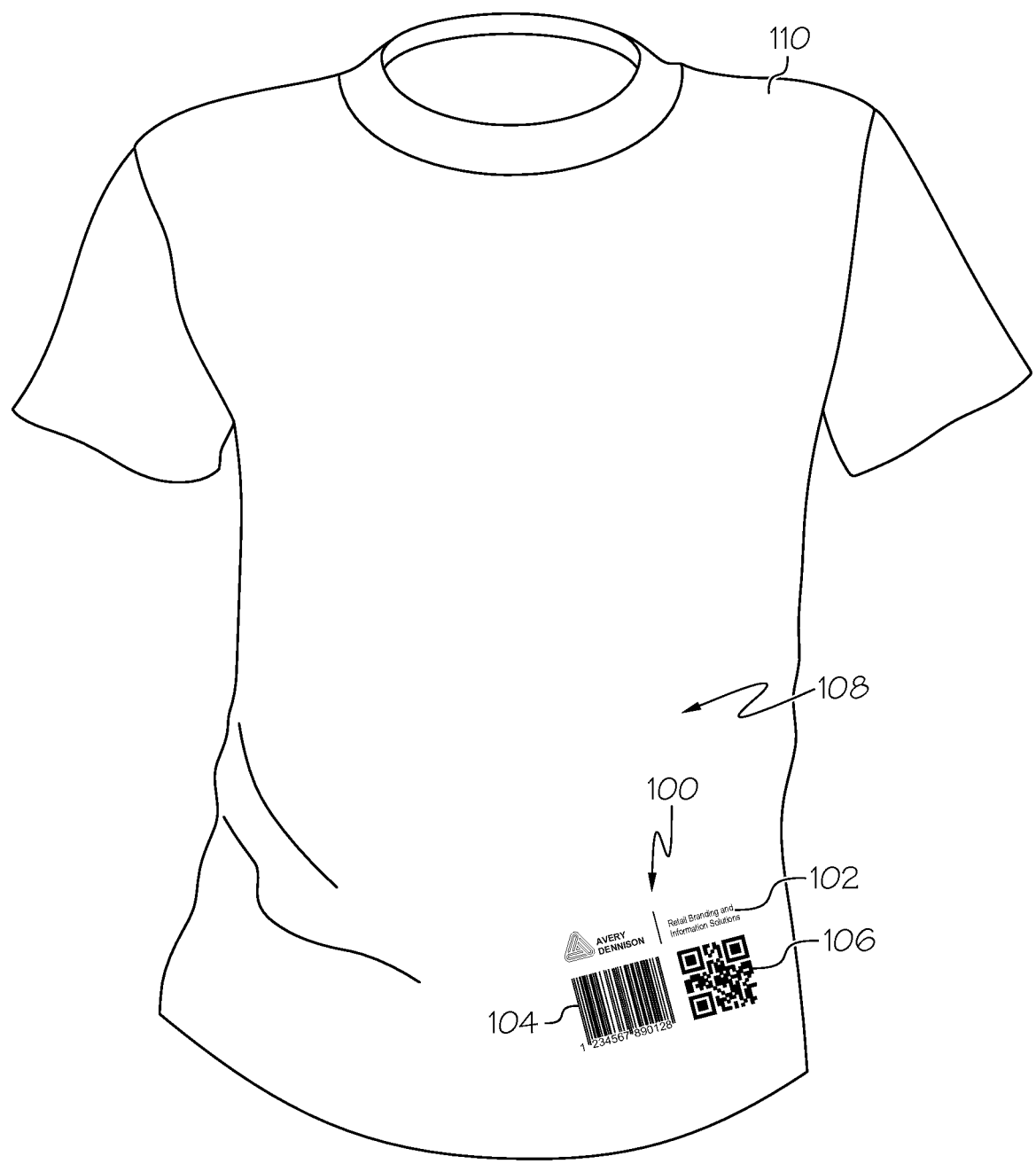
FIG. 2 illustrates a perspective view of the heat transfer applied to a clothing article in accordance with the disclosed architecture.

As illustrated in FIG. 2, the heat transfer 100 is applied to a base material 108. The base material 108 is typically a woven or non-woven fabric material, natural or synthetic base material, but can be any suitable material as is known in the art. The base material 108 is typically produced using routine methods known in the art. Further, the base material 108 would typically be part of (incorporated into) a clothing article 110, such as a t-shirt, cap, sweatshirt, jersey, apparel accessory etc., or any other suitable clothing article 110 as is known in the art. The heat transfer 100 is applied to the clothing article 110 via any suitable method as is known in the art for applying heat transfers. The heat transfer 100 would be applied to the inside or the outside of the clothing article 110, or even on a tag of the clothing article 110 depending on the wants and/or needs of the manufacturer or user.

In this way, the clothing article 110 becomes the admission ticket for a specific event and a paper ticket is not needed. Utilizing a clothing article 110 and heat transfer 100 as an admission ticket, has the potential to generate more business for a sponsor of a specific event. For example, shirts and caps can be manufactured with the sponsor's corporate colors and the heat transfers 100 can comprise the sponsor's image or logo, as well as the admission ticket itself. Thus, if the shirt is the admission ticket, potentially all of the attendants to the specific event would be wearing the sponsor's image or logo, as well as the sponsor's corporate colors. Clothing articles 110 that aren't sold as admission tickets could then be disabled and the clothing articles 110 could then be sold without the admission ticket function enabled. Further, the heat transfer 100 can also comprise anti-counterfeit features, such as UV inks, etc., to guarantee that the admission tickets/shirts are authentic and have been legally acquired by the user.

Figure 3:
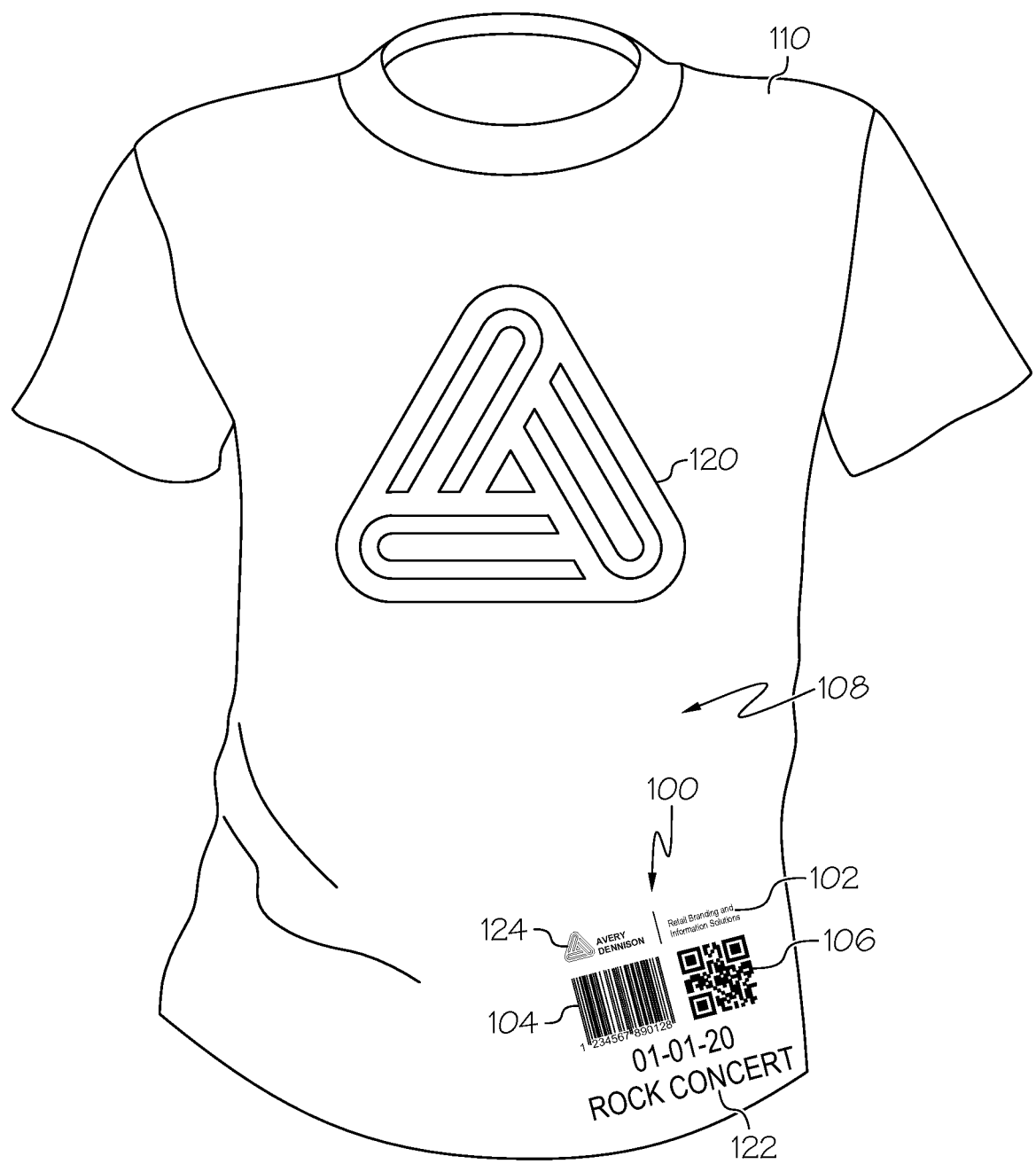
FIG. 3 illustrate a perspective view of the heat transfer applied to a clothing article with matching promotional heat transfer in accordance with the disclosed invention.

Referring now to FIG. 3 a further adaptation of the present invention is provided in which the clothing article 110 is provide with an additional heat transfer 120 which matches the corporate sponsor logo 124 provided in heat transfer 100. In addition, other human readable indicia 122 may be provided so as to create a souvenir piece for the wearer such as a date of the particular event or the name of the event. In this embodiment, matching indicia of the heat transfers 120 and 100 create a potentially more aesthetically appealing article and potentially increase the authenticity of the article.

The present invention can be formed in the following manner. A manufacturer or user would design the heat transfer 100 based on their needs and/or wants for a specific event. For example, the manufacturer or user could design the heat transfer 100 to be an admission ticket to a Cleveland Cavaliers® or CAVS® game. The manufacturer or user would then print the heat transfer 100 with any suitable ink as is known in the art, to create the pre-determined design (i.e., the admission ticket). The manufacturer or user would then determine on what type of merchandising material (or clothing article 110) to apply the heat transfer 100. For example, the manufacturer or user could apply the heat transfer 100 to a t-shirt, sweatshirt, cap, jersey, etc. The manufacturer or user then applies the heat transfer 100 to the specific t-shirt, sweatshirt, cap, jersey, etc. via any suitable method as is known in the art for applying heat transfers. If requested, the manufacture could then apply the matching indicia heat transfer 120 or begin with a base stock having preprinted heat transfers 120 and then apply the heat transfer admission 100 piece.

Once the present invention is formed, the clothing article 110 with the heat transfer 100 can be sold as an admission ticket to the specific event. Clothing articles 110 that aren't sold as admission tickets could then be disabled and the clothing articles 110 could then be sold without the admission ticket function enabled. The clothing article 110 and heat transfer 100 can then be worn to the specific event. Specifically, a user would use the t-shirt as an admission ticket to gain entrance to the event. The heat transfer 100 would be scanned from the front of the shirt, and the unique bar code and/or QR codes would be used to identify the user's seat location and other identifying details. The user would not need a paper ticket to be admitted into the event, and would not have to worry about losing their admission ticket, and would not have to worry about the ticket being destroyed due to wind or rain, or other adverse conditions.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An event admission and seating system, the system comprising:
   a clothing article that is one of a shirt, a pair of pants, a hat, or a scarf;
   a breathable, flexible, heat transfer bearing an image, the heat transfer being bonded to a surface of the clothing article through application of at least one of heat and pressure to the heat transfer when it is in contact with the clothing article,
   wherein the image comprises at least one bar code or at least one QR code bearing information that corresponds to a specific assigned seat at a spectator event and that grants a person permission to access the spectator event and sit at the assigned seat as an observer based on the verification of the information borne by the at least one bar code or at least one QR code.

2. The system of claim 1, where the at least one QR code identifies personal information.

3. The system of claim 1, where the image is printed with ultraviolet-curable inks.

4. The system of claim 3, where the image includes human readable information, and has high durability for wind, rain, and light.

5. The system of claim 3, where the ultraviolet-curable inks-comprise the one or more anti-counterfeit features.

6. The system of claim 1, where the base material is a woven fabric material.

7. The system of claim 1, where the base material is a non-woven fabric material.

8. The system of claim 1, where the base material is made of natural and/or synthetic material.

9. The system of claim 1, where the heat transfer is applied to either the inside or the outside of the clothing article.

10. The system of claim 1, where the heat transfer is applied on a tag of the clothing article.

11. The system of claim 1, where the printed matter includes a sponsor's image or logo.

12. The system of claim 1, further comprising a database linking the information of the at least one bar code or at least one QR code to the specific assigned seat at a spectator event.

13. The system of claim 12, further comprising a computing device configured to grant the person permission to access the spectator event and sit at the assigned seat as an observer based on the verification of the information borne by the at least one bar code or at least one QR code.

14. An event access and seating method, comprising:
    using at least one of heat and pressure, bonding a breathable, flexible, heat transfer bearing an image to a clothing article that is one of a shirt, a pair of pants, a hat, or a scarf, wherein the image comprises at least one bar code or at least one QR code bearing information that corresponds to a specific assigned seat at an event and that grants a person access to the event;
    selling the clothing article bearing the heat transfer as a spectator event ticket that corresponds to the specific assigned seat;
    scanning the at least one bar code or at least one QR code;
    verifying that the information borne by the at least one bar code or at least one QR code corresponds to the specific assigned seat;
    granting a person permission to access the spectator event and sit at the assigned seat as an observer based on the verification of the information borne by the at least one bar code or at least one QR code.

15. The method of claim 14, wherein the heat transfer comprises a UV-ink based anti-counterfeiting measure.

16. The method of claim 14, wherein the at least one bar code or at least one QR code is unique to the garment and an event.

17. The apparel item of claim 14, wherein the image comprises at least one bar code and at least one QR code bearing information that corresponds to a specific assigned seat at an event and that grants a person access to the event.

\* \* \* \* \*